United States Patent [19]

Castel

[11] Patent Number: 4,848,949
[45] Date of Patent: Jul. 18, 1989

[54] DEVICE AND METHOD FOR REMOTELY POSITIONING AND CONNECTING AN END OF AN ELONGATE ELEMENT TO A CONNECTOR

[75] Inventor: Yvon Castel, Croissy Sur Seine, France

[73] Assignee: Institut Francais du Petrole, Rueil-Malmaison, France

[21] Appl. No.: 920,187

[22] Filed: Oct. 17, 1986

[30] Foreign Application Priority Data

Oct. 18, 1985 [FR] France ............... 85 15500

[51] Int. Cl.⁴ ............................................. B65D 59/00
[52] U.S. Cl. ........................................ 403/12; 403/13; 405/169; 166/341
[58] Field of Search ............... 166/341, 342, 343, 344; 405/169, 166; 403/12, 13

[56] References Cited

U.S. PATENT DOCUMENTS

| | | | |
|---|---|---|---|
| 4,102,146 | 7/1978 | Dietrich | 405/169 |
| 4,161,367 | 7/1970 | Cuiper et al. | 166/343 X |
| 4,490,073 | 12/1984 | Lawson | 405/169 |
| 4,643,614 | 2/1987 | Laursen | 405/169 |

Primary Examiner—Andrew V. Kundrat
Attorney, Agent, or Firm—Antonelli, Terry & Wands

[57] ABSTRACT

A method and device are provided for remotely connecting an end of an elongate element to a connector integral with a main installation, comprising means for guiding said elongate element, first means for moving said guide means with respect to said main installation and second means for moving said end with respect to said connector.

12 Claims, 6 Drawing Sheets

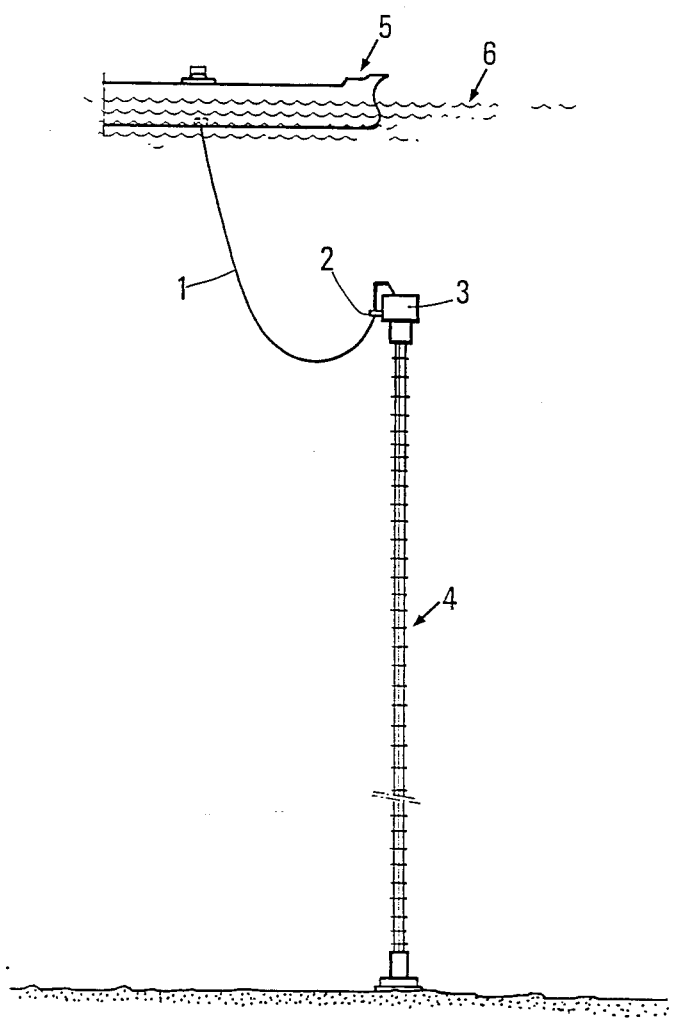

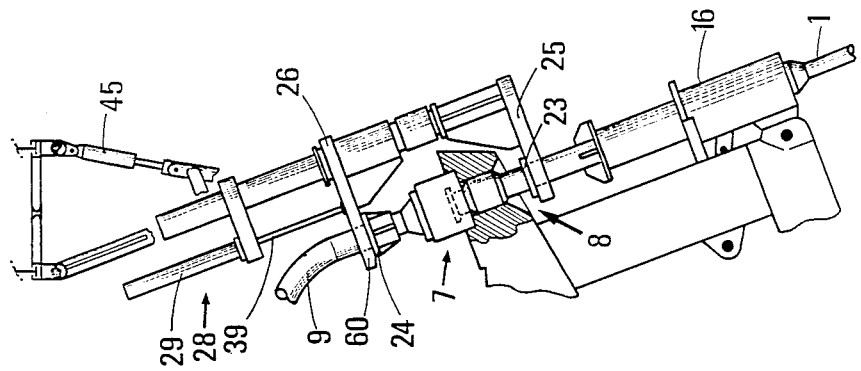
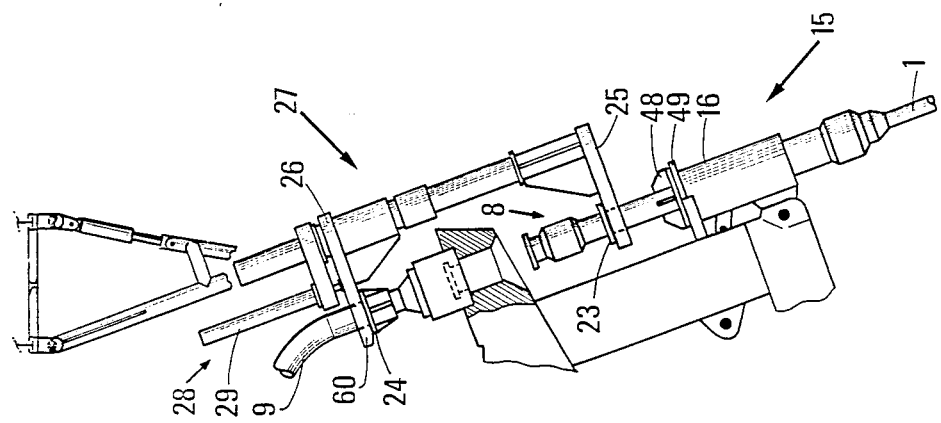
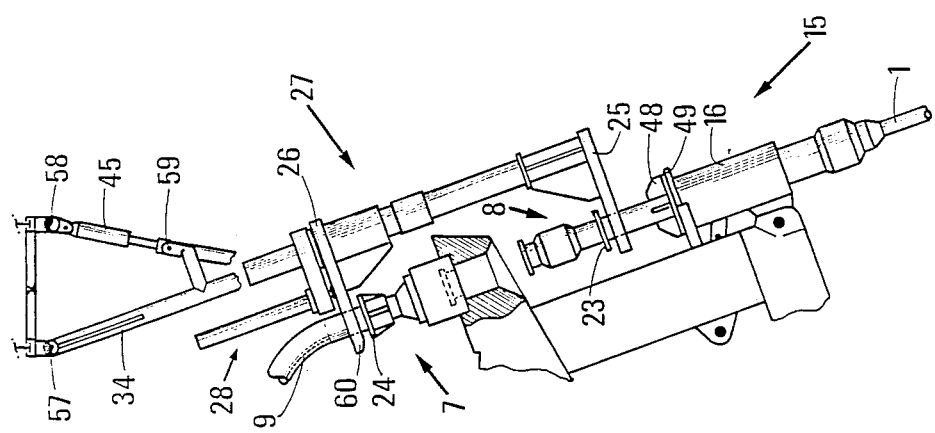

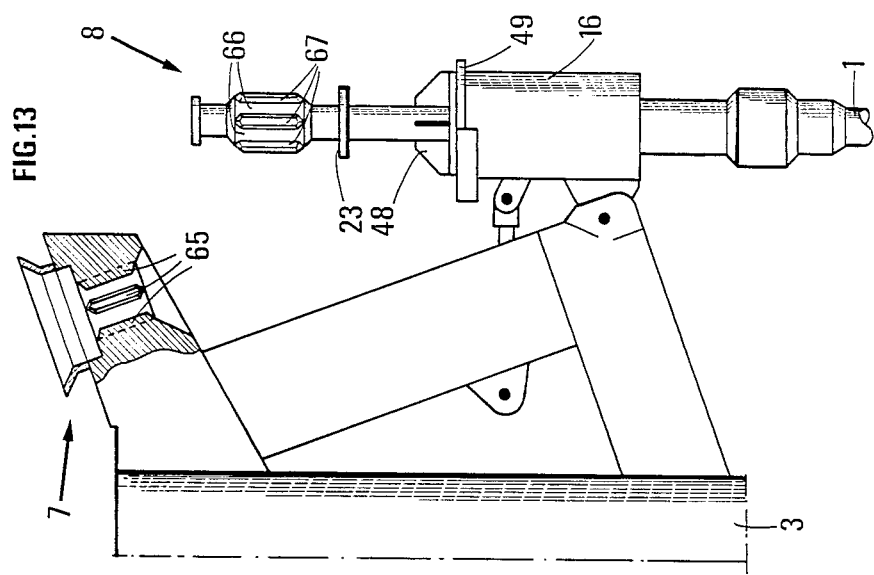
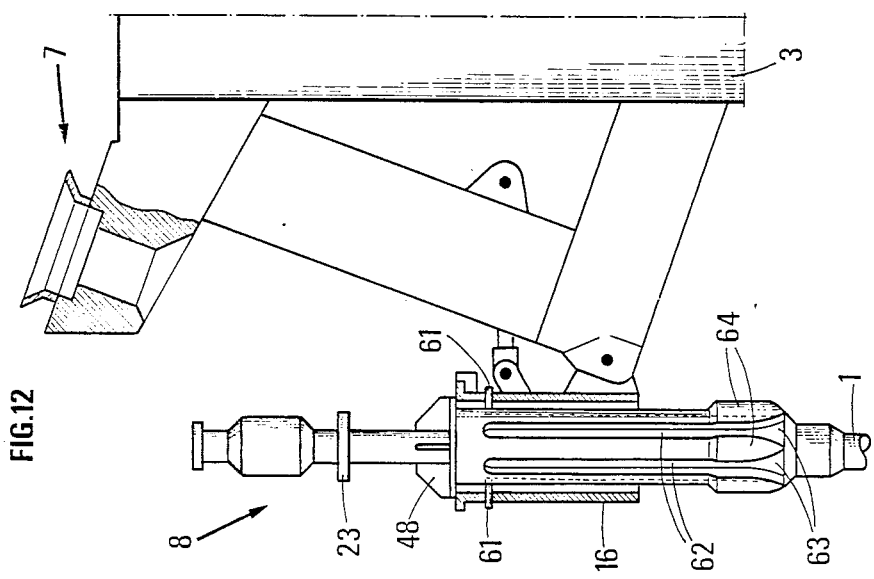

4,848,949

DEVICE AND METHOD FOR REMOTELY POSITIONING AND CONNECTING AN END OF AN ELONGATE ELEMENT TO A CONNECTOR

BACKGROUND OF THE INVENTION

The present invention relates to a method and device for remotely positioning and connecting an end of an elongate element such as an oil production line, the connection being made to a connector integral with an installation which will be termed "main installation".

This invention may be applied more particularly to the field of offshore petroleum effluent production, when it is a question of connecting an end of a pipe to a connector immersed at a given depth.

Up to now, such connections have raised problems of reliability and required divers, which limited the depth at which they could be formed.

SUMMARY OF THE INVENTION

The present invention provides a device for remotely positioning and connecting an end of an elongate element to a connector integral with a main installation. The invention is characterized in that it comprises means for guiding translatory movement of the end of the elongate element, first means for moving the guide means with respect to the main installation and second means for moving said end with respect to the connector, and characterized in that the first moving means is independent of the second moving means.

By the word "independent", it should be understood that the two moving means are separated from each other.

The first means for moving said guide means may comprise a rotational shaft integral with said installation and about which the guide means may pivot between two positions and an actuating cylider having two ends, a first end being integral with said guide means and a second with said installation.

The device of the invention may comprise an articulation having a bearing and a shaft whose axis is substantially horizontal and the guide means may comprise a tube having an axis of revolution contained substantially in a vertical plane and the articulation may connect said main installation to said tube.

The connector may include a first stop, the end of the elongate element may include a second stop, the second moving means may comprise two jaws adapted for cooperating with the first and second stops and, finally, the jaws may be moved by an actuating cylinder.

The second moving means may be mounted on an articulated arm integral with the main installation.

Still within the scope of the present invention, the second moving means may comprise an actuating cylinder having two ends, one of which is integral with the main installation and the other with an arm.

The guide tube may have at least one stud or rail and the end of the elongate element may have at least one groove adapted for cooperating with said stud.

The end of the elongate element may comprise at least one groove and the connector may comprise at least one stud or rail adapted for cooperating with said groove.

Said second moving means may be retractable in relation to said first moving means.

The present invention also provides a method for remotely connecting one end of an elongate element with a connector integral with a main installation. The method is characterized in that it comprises the following steps:

- positioning of the end of the elongate element with respect to a guide means,
- moving said guide means so as to place said end and said connector in alignment with each other by use of a first moving means,
- positioning a second moving means, and
- moving said end with respect to said connector with said second moving means until effective connection of the end and the connector is obtained.

The movement of said guide means may correspond to pivoting about a substantially horizontal axis.

Displacing and guiding means and positioning said second moving means may be carried out, simultaneously.

The positioning of said second moving means may be achieved by displacing said guiding means.

BRIEF DESCRIPTION OF THE DRAWINGS

The present invention will be better understood and its advantages will appear more clearly from the following description of a particular embodiment illustrated by the accompanying Figures in which:

FIG. 1 shows a general diagram of an oil production stringer and its connection to a ship by means of an elongate element such as a transfer line, FIGS. 8 to 11 show the connection between the end of the transfer line and the connector and, FIGS. 12 and 13 illustrate two embodiments of a transfer line end, allowing precise angular positioning of this end with respect to a connector.

DESCRIPTION OF THE PREFERRED EMBODIMENTS

Figure 3:
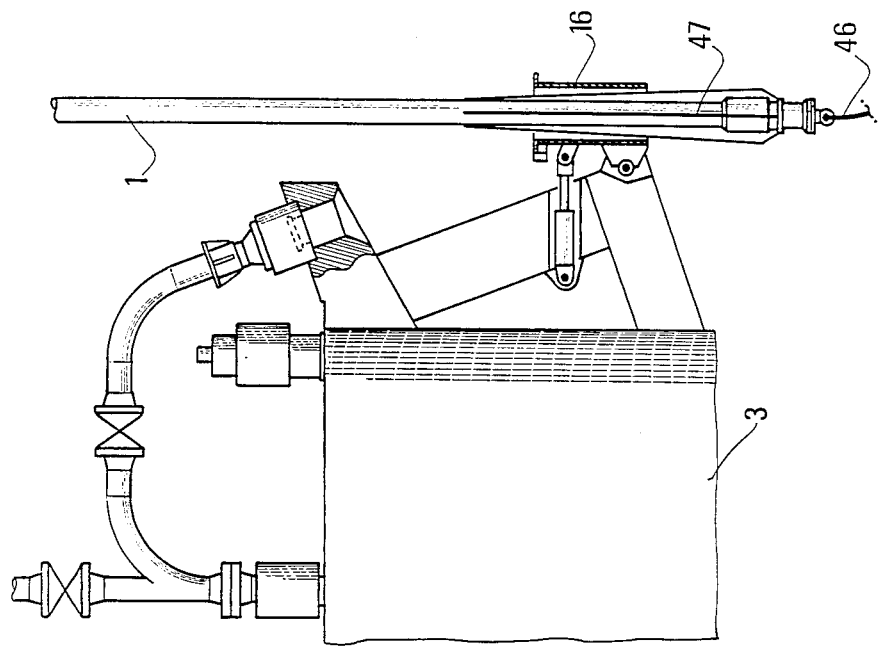
FIGS. 2 to 5 illustrate the positioning of a petroleum effluent transfer line on a so called main installation, such as a buoy.

The following description relates to the particular case of positioning and connecting a line 1 (FIG. 1) to a connector 2 fixed to an immersed buoy 3. This buoy being the terminal part of a stringer 4 for transferring the production of an undersea production site.

Line 1 may be connected to a ship 5 situated at the surface of the water 6 and may serve for conveying the production of the undersea well to the ship 5. In addition, this line may comprise several pipes. This line, which is flexible once in position, is suspended at one of its ends from the ship 5 and at its other end from the connector 2 and takes on substantially the shape of a catenary.

Figure 4:
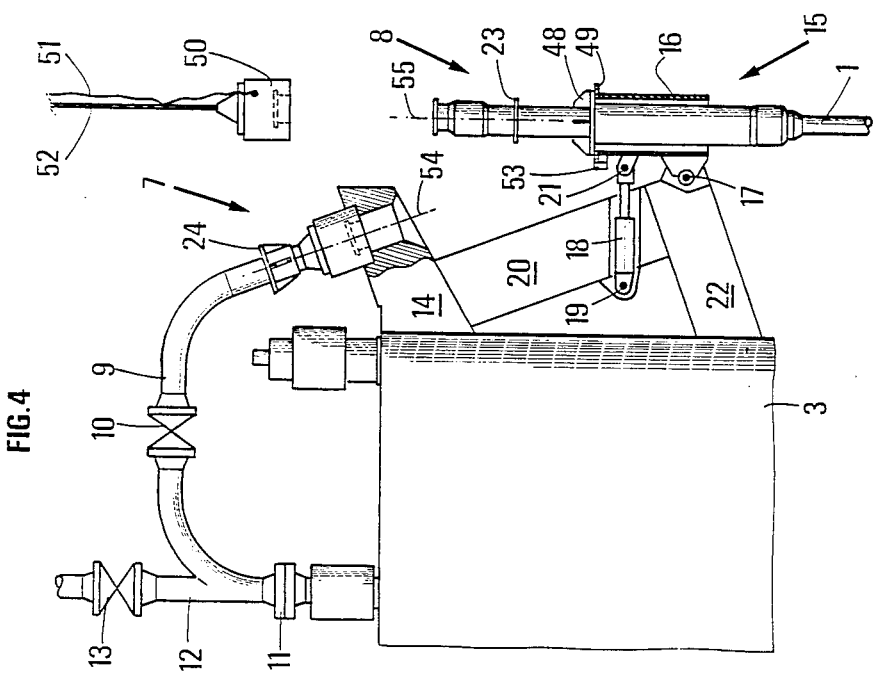

FIG. 4 shows a detail of the immersed buoy 3. In this Figure, the reference numeral 7 designates the connector as a whole on which the end 8 of the transfer line 1 will be fixed.

Connector 7 is connected by a pipe 9, which may be in the form of a swan neck, to a flange 11 via a remote controlled valve 10. Flange 11 provides coupling more particularly to a header coming from the riser 4. In the case shown in FIG. 4, the swan neck pipe comprises a branch pipe 12 giving vertical access to the line from the riser 4.

This pipe includes a valve 13 which may be remote controlled.

Connector 7 is fixed to buoy 3 by means of pipe 9 and may be guided by a support arm 14.

Reference numeral 15 designates means for guiding the transfer line 1. In the case shown in FIG. 4, these means comprise a cylindrical tube 16 through which the line 1 passes.

In the case of FIG. 4, the guide means 15 may be moved about a substantially horizontal shaft 17 by means of a shaft bearing assembly. Pivoting of guide means 15 is controlled by an actuating cylinder 18 which may be electric or hydraulic. This cylinder 18 may be remotely controlled from the surface.

One of the ends of this cylinder is secured to the buoy 3, by means of an articulation 19 connected to a support arm 20 while the other end is connected to the guide means 15 by an articulation 21.

The shaft 17 of the guide means 15 is secured to the buoy 3 through a support arm 22. The support arms 14, 20 and 22 may be secured to each other, as is shown in FIG. 4.

Figure 7:
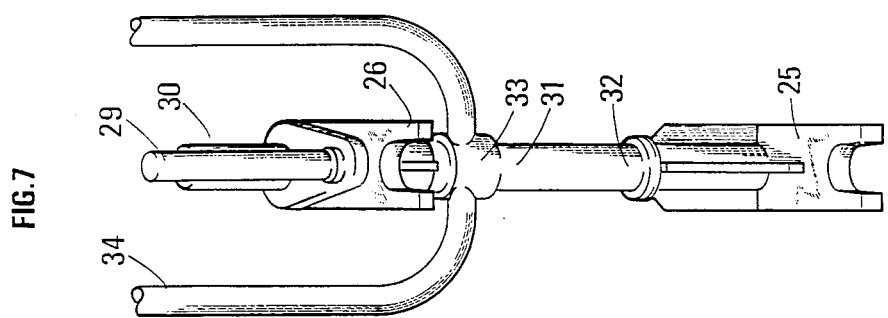
FIGS. 6 and 7 show the details of a means for moving the end of a transfer line with respect to a connector situated on a main installation.
Figure 6:
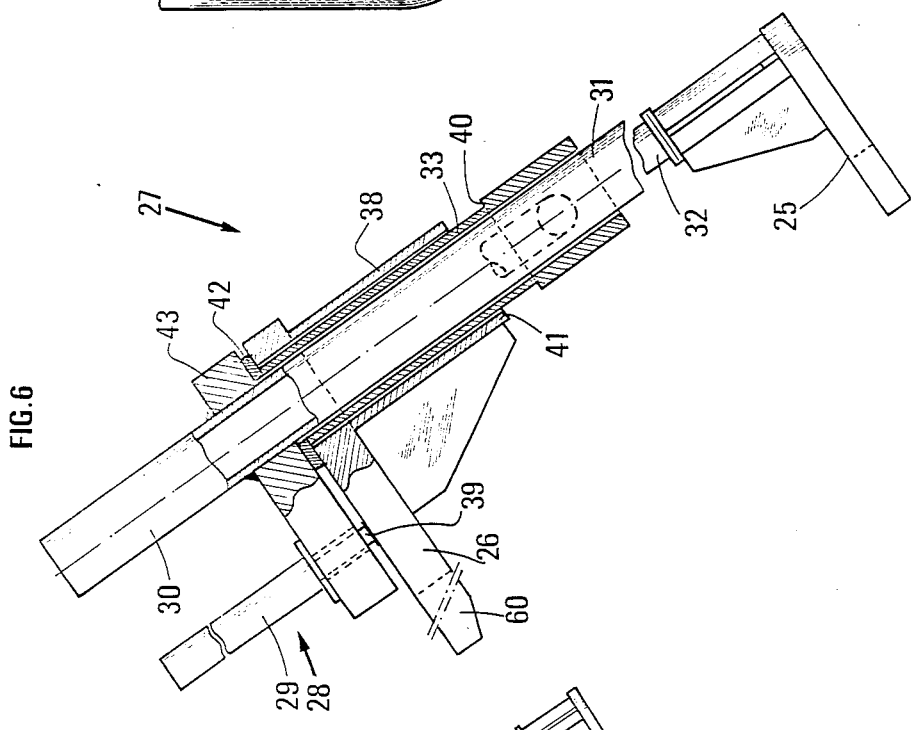

The end 8 of line 1 comprises a retaining stop 23 and connector 7 has mounted thereover another retaining stop 24. These retaining stops 23 and 24 are called on to cooperate with jaws 25 and 26 of a gripper 27 (FIGS. 6 and 7). These jaws will be termed respectively upper and lower jaws.

FIG. 7 is a left hand side view of the gripper shown in FIG. 6.

Jaws 25 and 26 may each have portions in the form of a fork so as to grip be better adapted to the shape of the elements with which they are intended to cooperate, in this case cylindrical shaped elements. In the case of FIG. 6, jaws 25 and 26 of gripper 27 are actuated by a cylinder 28.

The body 29 of cylinder 28 is fixed to one of the ends 30 of a rod 31 which has another end 32 fixed to jaw 25.

In FIG. 6, the second end 32 of rod 31 which includes the lower jaw 25 has been drawn to a different scale from the rest of the Figures so as to reduce the space required.

Rod 31 is positioned within the cylindrical guide sleeve 33 inside which, the rod may slide.

Guide sleeve 33 is secured to buoy 3 by means of articulated arms 34 and other elements, such as a frame 35 and means 36 for centering the frame 35 on the buoy 3.

The upper jaw 26 is secured to guide means comprising an external sleeve 38 which may slide about the cylindrical sleeve 33.

The upper jaw 26 is also secured to the rod 39 of the actuating cylinder 28.

Reference numeral 40 in FIG. 6 designates a stop formed at the lower end of the cylindrical sleeve, which cooperates as required with the lower end 41 of the sleeve 38 the guide means of the upper jaw 26.

Reference numeral 42 designates an upper stop limiting the travel of sleeve 38 guiding the upper jaw 26. This stop is shown as a washer which may be free, integral with the cylindrical sleeve 33 or form an integral part of element 43 which maintains the body 29 of cylinder 28 fixed with respect to rod 31.

The articulated arm 34 supporting the gripper 27 is equipped with handling means 44 comprising an actuating cylinder 45 which may be remotely controlled.

Figure 2:
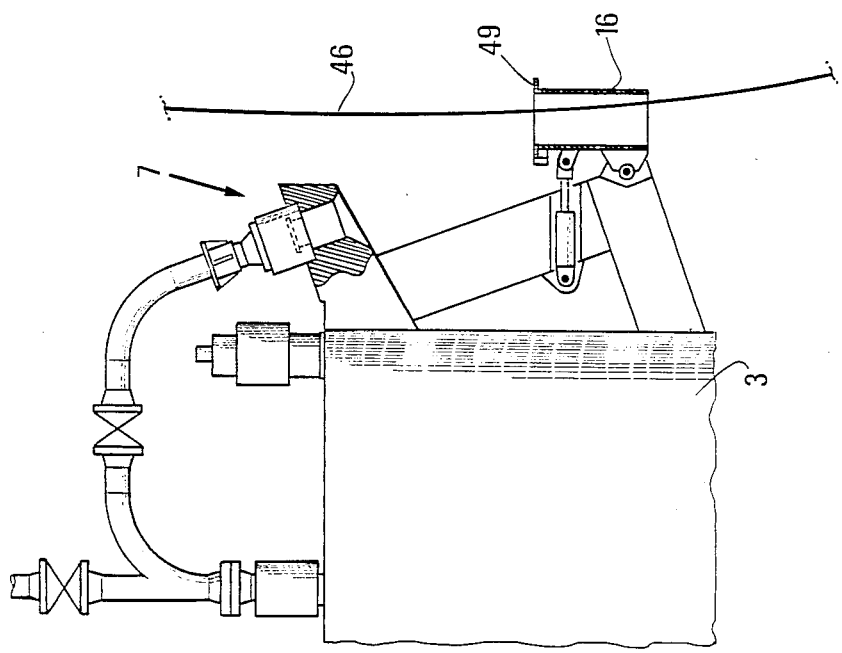

One example of using the above described device is given below; it being assumed that buoy 3 is already immersed in water and that a cable 46 passes through the cylindrical guide tube 16 (FIG. 2).

This cable may be positioned before the buoy is immersed, one of the ends of the cable 46 being fixed to line 1 while the other of the cable is fixed, for example, to a drum placed on ship 5. The transfer line 1 may be stored on another ship used for assisting the first ship 5 when positioning line 1 for the first time.

The sequence of positioning line 1 is shown in FIGS. 2 to 5.

FIG. 2 shows the original condition from which line 1 is lowered, the end 47 of which is to be connected to ship 5 or to any installation. The end 47 is introduced and guided in tube 16 by means of the cable 46 (FIG. 3).

The introduction of line 1 into tube 16 continues until the end 8 to be connected to the buoy is immobilized against tube 16, this may be achieved by means of a stop 48 fixed to the end 8 of the line and which cooperates with a stop 49 fixed to the guide tube 16.

During the lowering phases of line 1, the line may be suspended from a temporary connector 50, which may be remotely controlled for example by means of a hydraulic line 51. The temporary connector 50 is suspended from a surface installation, such as a ship, by a cable 52.

FIG. 4 shows the moment when the end 8 of line 1 has been positioned in the guide tube 16 and when the connector 50 has already been withdrawn.

This operation being finished, the cylinder 18 is actuated so as to move the guide tube 16 which pivots about the pivot shaft 17 until the end 8 of the line is situated opposite the connector 7 fixed to the buoy 3.

Figure 5:
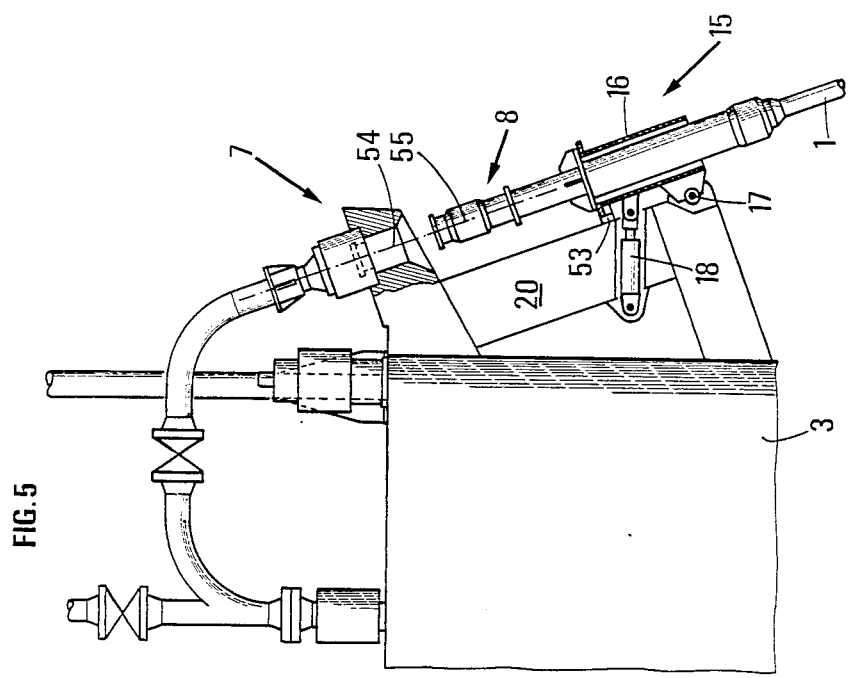

Positioning of the guide tube 16 may be provided by a lateral stop 53 which comes into abutment against arm 20 (as shown in FIG. 5).

In the case of the example described, once the guide tube has been placed in the pivoted position, the axes of revolution 54 and 55 of connector 7 and of end 8, respectively, are aligned (FIG. 5).

Figure 8:
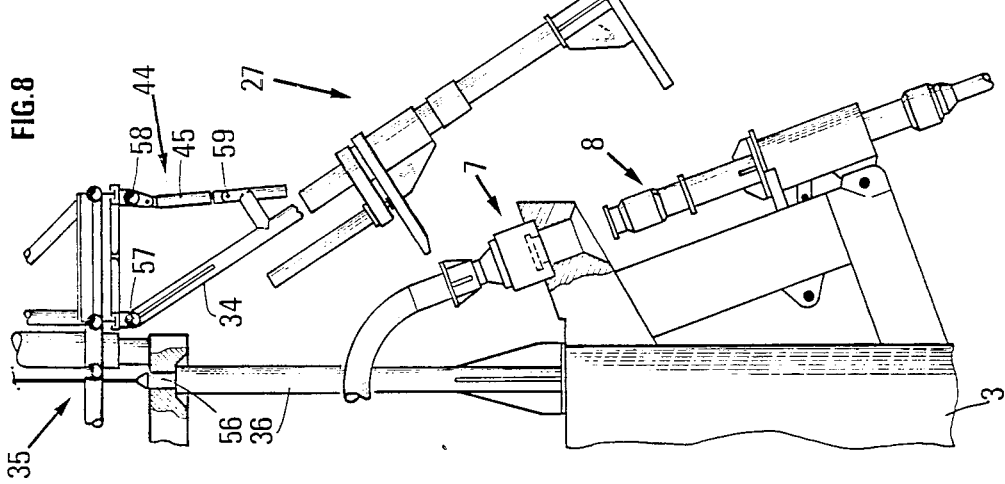

To achieve the connection between end 8 of line 1 and the connector 7, frame 35 is lowered to which the gripper 27 is fixed is lowered, as shown in FIG. 8.

Frame 35 is positioned on buoy 3 through a centering means 36 comprising positioning studs 56.

Once the frame 35 has been positioned, cylinder 45 is actuated and causes the arm 34 supporting the gripper 27 to rotate about the shaft 57. The cylinder 45 is connected to the frame through an articulation 48 and to the arm 34 through an articulation 59.

The rotation of arm 34 about the shaft continues until the fork portions of the jaws 25 and 26, respectively, cooperate with pipe 9 and the end 8 of the transfer line 1.

This may be checked by means of cameras (not shown) fixed, for example, to the gripper 27 at the level of the jaws.

Of course, gripper 27 is positioned with respect to the connector 7 and to the end 8 so that the space between jaws 25 and 26 encompasses the retaining stops 23 and 24.

The end of jaws 25 or 26 may comprise a chamfer 60 for positioning the fork portions, if necessary, more readily with respect to stops 23 and 24.

In the case of the position shown in FIG. 9, such a chamfer is pointless since, when gripper 27 is in position, a free space exists between jaws 25 and 26, and the stops 23 and 24. This is possible because of the good initial positioning of gripper 27 with respect to stops 25 and 26.

With the gripper 27 positioned, cylinder 28 is actuated which causes jaws 25 and 26 to close up. They come to bear on stops 23 and 24 and move the end 8 of the line 1 until it is connected with the connector 7.

Locking of connector 7 and the end 8 of line 1 may be automatic or controlled.

Once the connection provided, it is possible to actuate the cylinder in the reverse direction from that which caused jaws 25 and 26 to draw together so as to move the jaws apart and so as to be able to release gripper 27 by actuating cylinder 45 and so as to finally withdraw frame 35 is required.

The operation of the gripper, in itself, is not difficult to understand, however it should be mentioned that the order in which the jaws come into operation depend on the friction and gravity forces existing between the external sleeve 38 and the cylindrical sleeve 33, on the one hand, and between the same sleeve 33 and rod 31, on the other, and of course on the positions of the different stops 23, 24, 40 and 42.

When the transfer line 1 comprises several pipes, it is important to be able to position these different pipes with respect to the corresponding pipes situated on the same side as buoy 3 and connector 7.

For this, the guide tube 16 may comprise one or more studs 61 for cooperating with grooves which may be longitudinal 62 and which are formed at the end 8 of the transfer line 1 below the stop 48.

Of course, the number of grooves 62 depends on the symmetry with which the pipes are distributed in line 1.

Thus, if there is no symmetry, there will only be a single groove since an angular position must be imposed on line 1.

If the symmetry of distributing the pipes is 180°, there may be at most two grooves and two studs, if the symmetry of distribution is 120°, there may be at most 3 grooves and 3 studs and so on.

Of course, it is advantageous for the base 63 of the grooves to have a funnel shape allowing studs 61 to penetrate into grooves 62 without any risk of studs 61 becoming jammed against the edge of space 64 between two grooves.

With this embodiment, there may be a risk of damage to the transfer line 1, during lowering thereof through the guide tube 16, to the extent that line 1 may come into contact with studs 61.

This disadvantage may be reduced by giving studs 61 the shape of a rail, such as that shown in FIG. 13 and which is designated by the reference numeral 65.

The above mentioned disadvantage may be completely removed using the configuration shown in FIG. 13. In fact, in the case of this embodiment, the guide tube 16 comprises no guide stud or rail on its internal surface.

The guide grooves 61 are situated at the end 8 of the transfer line 1 above stop 38 and cooperate with integral fingers or rails 65 situated below the connector 7.

Thus, orientation of line 1 is provided while drawing end 8 and connector 7 together.

The edges of rails 65 and of the spaces 67 between the grooves may be advantageously shaped so as to facilitate positioning of end 8 of line 1 with respect to the connector 7.

In so far as the configuration shown in FIG. 12 is concerned, without departing from the scope of the present invention, studs 61 may be placed at the end 8 of the transfer line 1 and the grooves inside the guide tube 16.

What is claimed is:

1. A device for remotely positioning and connecting an end of an elongate element to a connector integral with a main installation, comprising means for guiding translatory movement of said end of said elongate element, first means for moving said guide means with respect to said main installation and second means for moving said end with respect to said connector to provide a connection therebetween; said first moving means operating independently of said second moving means; said connector having a first stop, said end of said elongate element having a second stop, said second moving means including an assembly comprising a gripper equipped with two jaws adapted for cooperating with said first and second stops and an actuating means; said jaws being moved by the actuating means from positions wherein the jaws are spaced from the stops to their positions to a position wherein the stops are contacted by the jaws.

2. The device as claimed in claim 1, wherein said first means for moving said guide means comprise a shaft integral with said installation and about which the guide means may pivot between two positions and an actuating cylinder having two ends, a first end being secured to said guide means and a second end to said installation.

3. The device as claimed in claim 1, further comprising an articulation consisting of a bearing and a shaft whose axis is substantially horizontal, said guide means comprising a tube having an axis of rotation located substantially in a vertical plane and said articulation connects said main installation to said tube.

4. The device as claimed in claim 1, wherein said second moving means is mounted on an articulated arm secured to said main installation.

5. The device as claimed in claim 4, wherein said second moving means comprises an actuating cylinder having two ends, one of which is secured to the main installation and the other to said articulated arm.

6. The device as claimed in claim 3, wherein said tube comprises at least one projection and the end of said elongate element comprises at least one groove adapted for cooperating with said projection.

7. The device as claimed in claim 3, wherein said end of said elongate element comprises at least one groove and said connector comprises at least one projection adapted for cooperating with said groove.

8. The device as claimed in claim 1, wherein said second moving means are retractable in relation to said first moving means.

9. A method for remotely connecting an end of an elongate element with a connector integral with a main installation, comprising the following steps:
  positioning the end of said elongate element within guide means,
  positioning said guide means with a first moving means so as to place said end and said connector in alignment with each other,
  positioning a second moving means in contact with said end of said elongate element, and
  moving said end with respect to said connector with said second moving means until effective connection of said end and said connector is obtained; the positioning of said guide means and positioning of said second moving means being carried out simultaneously.

10. The method as claimed in claim 9, wherein positioning of said second moving means is obtained by positioning of said guide means.

11. The device as claimed in claim 1, wherein said guide means comprises a guide tube pivotally connected to said main installation and said end of said elongate element is adapted to slide within said tube; said second means for moving said end with respect to said connector further including frame means secured to said main installation for moving the assembly to cause the jaws to contact the connector and the end of the elongate element, respectively, said actuating means including an actuating cylinder for moving the jaws from the positions wherein the stops are intially contacted by the jaws to positions wherein said end of the elongate element is caused to engage said connector.

12. The method as claimed in claim 9, wherein the movement of said end with respect to said connector is effected by jaws of said second moving means that engage the end and the connector, respectively, and that move the end towards the connector.

* * * * *